United States Patent
Jorabchi et al.

(10) Patent No.: US 12,322,584 B2
(45) Date of Patent: Jun. 3, 2025

(54) APPARATUS AND METHODS FOR DETECTION AND QUANTIFICATION OF ELEMENTS IN MOLECULES

(71) Applicant: Georgetown University, Washington, DC (US)

(72) Inventors: Kaveh Jorabchi, Arlington, VA (US); Joseph Lesniewski, Washington, DC (US); Kunyu Zheng, Washington, DC (US); Samuel White, Washington, DC (US)

(73) Assignee: Georgetown University, Washington, DC (US)

( * ) Notice: Subject to any disclaimer, the term of this patent is extended or adjusted under 35 U.S.C. 154(b) by 362 days.

(21) Appl. No.: 17/785,838

(22) PCT Filed: Feb. 25, 2021

(86) PCT No.: PCT/US2021/019697
§ 371 (c)(1),
(2) Date: Jun. 15, 2022

(87) PCT Pub. No.: WO2021/173853
PCT Pub. Date: Sep. 2, 2021

(65) Prior Publication Data
US 2023/0024038 A1   Jan. 26, 2023

Related U.S. Application Data

(60) Provisional application No. 62/983,221, filed on Feb. 28, 2020.

(51) Int. Cl.
*H01J 49/00* (2006.01)
*G01N 30/72* (2006.01)
(Continued)

(52) U.S. Cl.
CPC ........ *H01J 49/005* (2013.01); *G01N 30/7206* (2013.01); *G01N 30/726* (2013.01);
(Continued)

(58) Field of Classification Search
CPC .... H01J 49/005; H01J 49/0077; H01J 49/105; H01J 49/165; H01J 49/168; G01N 30/7206; G01N 30/726; G01N 30/7266
(Continued)

(56) References Cited

U.S. PATENT DOCUMENTS 9,966,243 B2    5/2018  Jorabchi et al.
2020/0015717 A1*  1/2020  Taghioskoui ......... H01J 49/107

FOREIGN PATENT DOCUMENTS

EP    2 295 959    3/2011
EP    3 503 161    6/2019
(Continued)

OTHER PUBLICATIONS

Doezema et al., "Analysis of secondary organic aerosols in air using extractive electrospray ionization mass spectrometry (EESI-MS)," *RSC Advances*, 2(7): 2930-2938, Feb. 13, 2012.
(Continued)

*Primary Examiner* — Nicole M Ippolito
(74) *Attorney, Agent, or Firm* — Klarquist Sparkman, LLP

(57) ABSTRACT

A method that includes introducing at least one analyte into a gas plasma; generating neutral species from atoms of the analyte in the gas plasma; preferentially transporting the neutral species downstream of the gas plasma relative to any ions produced in the gas plasma; and reacting the neutral species of the analyte with at least one reagent ion downstream of the plasma resulting in ion species of the analyte, wherein the at least one reagent ion is supplied by an independent ion source.

20 Claims, 7 Drawing Sheets

(51) Int. Cl.
*H01J 49/10* (2006.01)
*H01J 49/16* (2006.01)

(52) U.S. Cl.
CPC ...... *G01N 30/7266* (2013.01); *H01J 49/0077* (2013.01); *H01J 49/105* (2013.01); *H01J 49/165* (2013.01); *H01J 49/168* (2013.01)

(58) Field of Classification Search
USPC ........................................ 250/281, 282, 288
See application file for complete search history.

(56) References Cited

FOREIGN PATENT DOCUMENTS

| WO | WO 2009/048739 | 4/2009 |
|---|---|---|
| WO | WO 2014/120676 | 8/2014 |

OTHER PUBLICATIONS

Gu et al., "Direct analysis of biological samples using extractive electrospray ionization mass spectrometry (EESI-MS)," *Analytical and Bioanalytical Chemistry*, 403(8): 2145-2153, Mar. 21, 2012.

International Search Report and Written Opinion issued for International Application No. PCT/US2021/019697 on May 21, 2021.

Lesniewski et al., "Mechanistic insights into chloride ion detection from the atmospheric-pressure afterglow of an argon inductively coupled plasma," *Journal of Analytical Atomic Spectrometry*, 33(11): 1981-1992, Sep. 19, 2018.

J. E. Lesniewski, K. Zheng, D. Dain, P. Lecchi, and K. Jorabchi, High-Sensitivity Elemental Mass Spectrometry of Fluorine by Ionization in Plasma Afterglow, Anal. Chem. 91, 3773-3777, Feb. 25, 2019.

Swanson et al., "Metal cationization extractive electrospray ionization mass spectrometry of compounds containing multiple oxygens," *Journal of the American Society for Mass Spectrometry*, 28(6): 1030-1035, Nov. 28, 2016.

Wang et al., "Plasma-assisted reaction chemical ionization for elemental mass spectrometry of organohalogens," *Journal of the American Society for Mass Spectrometry*, 25(4): 692-695, Jan. 29, 2014.

K. Zheng, M. J. Dolan Jr, P. J. Haferl, H. Badiei, and K. Jorabchi, Atmospheric-Pressure Dielectric Barrier Discharge as an Elemental Ion Source for Gas Chromatographic Analysis of Organochlorines, Anal. Chem. 90, 2148-2154, Dec. 20, 2017.

\* cited by examiner

APPARATUS AND METHODS FOR DETECTION AND QUANTIFICATION OF ELEMENTS IN MOLECULES

This is the U.S. National Stage of International Application No. PCT/US2021/019697, filed Feb. 25, 2021, which was published in English under PCT Article 21(2), which application in turn claims the benefit of U.S. Provisional Application No. 62/983,221, filed Feb. 28, 2020, which is incorporated herein by reference in its entirety.

ACKNOWLEDGMENT OF GOVERNMENT SUPPORT

This invention was made with government support under grant number CHE-1904835 awarded by the National Science Foundation and grant number GM132112 awarded by the National Institutes of Health. The government has certain rights in the invention.

BACKGROUND

The apparatuses and methods disclosed herein relate to plasma assisted reaction chemical ionization (PARCI). To detect and quantify atoms, molecules are introduced into a reactive plasma. Assisted by the plasma, the molecules breakdown and undergo reactions turning elements of interest into element-specific species. These plasma reaction products are then subjected to post-plasma ionization via reactions by ions and electrons. As a result, the element-specific species become charged, making them detectable by a mass spectrometer.

Our previous work on plasma assisted reaction chemical ionization (PARCI) has relied on the plasma to supply the charge (ions and electrons) for ionization. For example, we have used helium metastable atoms created by a helium plasma to react with dopants in the post-plasma, which results in production of electrons for formation of negative ions such as $Cl^-$ and $F^-$. We have also used an argon ICP to create NaF and $Na^+$ which then react in post-plasma region to form $Na_2F^+$ for detection of F in fluorinated compounds.

In addition, elemental detection of non-metals is challenging. The most commonly used method (ICP-MS) relies on $A^+$ ions where A represents atoms such as S, P, Cl, F. The ionization of elements in this fashion is inefficient because of high ionization potential of non-metals. Also isobaric interferences create difficulties in detection of $A^+$ ions. Another approach is chemical reaction interface mass spectrometry where products of chemical reaction interface such as HCl are ionized by electron impact in low pressure. The sensitivity for these analyses is low because of difficulty of transferring reaction products into the ionization chamber with high efficiency. In fact, detection of F with this technique has not been reported because HF is reactive resulting in extremely low efficiency of transfer into ionization chamber.

SUMMARY

Disclosed herein is a method comprising;
introducing at least one analyte into a gas plasma;
generating neutral species from atoms of the analyte in the gas plasma;
preferentially transporting the neutral species downstream of the gas plasma relative to any ions produced in the gas plasma; and
reacting the neutral species of the analyte with at least one reagent ion downstream of the plasma resulting in ion species of the analyte, wherein the at least one reagent ion is supplied by an independent ion source.

Also disclosed herein is an apparatus comprising:
a gas plasma module;
an ion source downstream from the gas plasma module, wherein the ion source is an electrospray ionization module or a corona discharge module; and
a mass spectrometer downstream from the ion source.

The foregoing will become more apparent from the following detailed description, which proceeds with reference to the accompanying figures.

DETAILED DESCRIPTION

Figure 1:
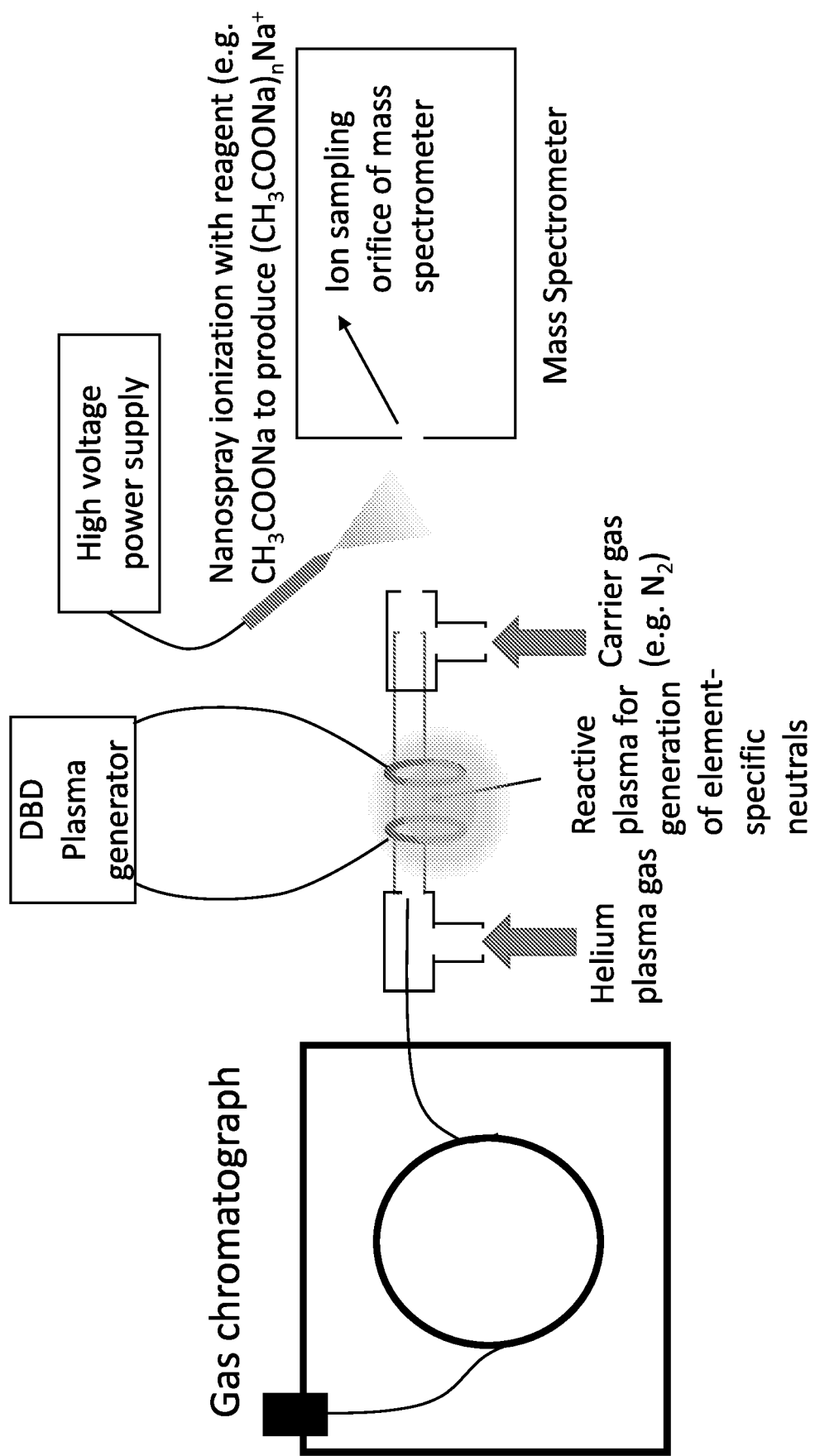
FIG. 1. Schematic of gas chromatography (GC) coupled to a dielectric barrier discharge for plasma assisted reaction with independent ionization using electrospray. Fluorinated and chlorinated compounds are detected as $Na_2F^+$ and $Na_2Cl^+$ in the mass spectrometer (MS).
Figure 2:
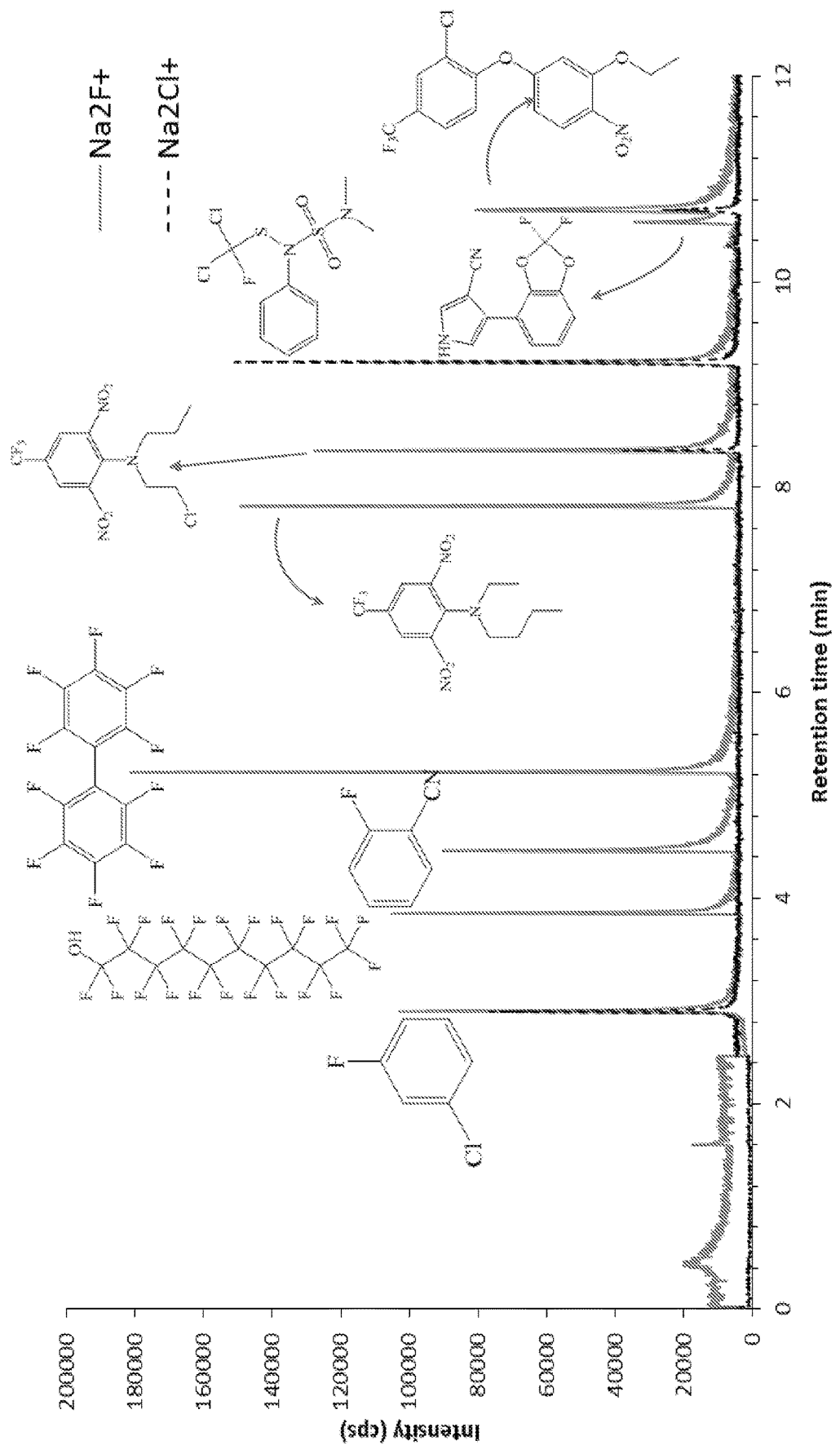
FIG. 2. Detection of a mixture of fluorinated and chlorinated compounds using apparatus of FIG. 1 by monitoring $Na_2F^+$ and $Na_2Cl^+$ in the MS.

Disclosed herein are improved apparatuses and methods for detecting and/or quantifying atoms of molecules in a sample. A sample may be directly analyzed by these methods to obtain the total concentration of each element in the sample. Alternatively, a mixture of molecules may be subjected to chromatography where molecules are separated from one another prior to online detection by the disclosed apparatuses. The concentration of atoms from each molecule is then determined using the disclosed methods.

The methods and apparatuses disclosed herein provide a method for the quantitative and isotopic measurement of chemical elements found in analytes, including, but not limited to, organic chemical compounds, polymers, amino acids, polypeptides, proteins, carbohydrates, nucleic acids, and lipids.

The disclosed apparatuses and methods improve the performance of elemental analysis by PARCI by separating the sources for neutral element-specific species and charging agents. The presently disclosed apparatus and methods do not rely on plasma for generating ions. Instead, an independent ion source (e.g., corona discharge, an electrospray ion source (ESI), photoionization, or glow discharge) is used for supplying reagent ions after the plasma. The presently disclosed apparatus and methods decouple ion generation from neutral generation in the plasma and provide a more robust operation.

In particular, according to the presently disclosed methods, neutral species from atoms of an analyte are generated in the gas plasma and these neutral species are preferentially transferred relative to any ions from the plasma to a point downstream of the plasma. In other words, the neutral species, but not the ions, are transported to a point downstream of the plasma. At this point downstream of the plasma, reagent ions from the independent ion source are reacted with the neutral species resulting in ion species of the analyte.

In certain embodiments, a reaction tube is provided downstream from the plasma wherein the reaction tube is 5-15 cm. The reaction tube reduces the ion flux from the plasma because the positive and negative ions and electrons from the plasma are allowed to react and neutralize each other. In addition, the electric field from the independent ion source repels the ions of the same polarity from the plasma. Therefore, the ions generated by the independent ion source dominate the ion population downstream from the reaction tube and lead to ion-neutral reactions that produce the analytical ions such as $Na_2^+$.

Further, the efficient ionization reactions such as cationization with $Na^+$ generates stable ions that can be formed in high pressures and are stable during transfer to the mass spectrometer. These attributes produce high sensitivity conditions for detection and quantitation of atoms, particularly useful for nonmetals.

In one configuration, an electrospray ionization source introduces reagent ions to the post-plasma region. The reagent ions react with the neutral plasma products and provide charged species for detection by mass spectrometer. Electrospray may be operated as pneumatically assisted spray or other methods such as microspray and nanospray without pneumatic assistance.

For example, FIG. 1 shows a configuration where compounds are separated by gas chromatograph (GC) and introduced into an atmospheric pressure dielectric barrier discharge sustained in helium using 100 mL/min of helium gas. Fluorinated and chlorinated compounds are converted to HF and/or HCl in the plasma. The plasma products are swept by a nitrogen flow of 2 L/min toward charges produced by a nano-electrospray ionization source (pulled glass capillary with 5 μm tip size) where reagent ions of $Na_{n+1}(CH_3COO)_n^+$ are supplied by applying 1500-2000 V to a solution of 10 mM sodium acetate in water. The reaction of plasma-produced element-specific species (HCl and/or HF) with reagent ions results in formation of $Na_2F^+$ and $Na_2Cl^+$ ions which are then detected by the mass spectrometer.

Figure 3:
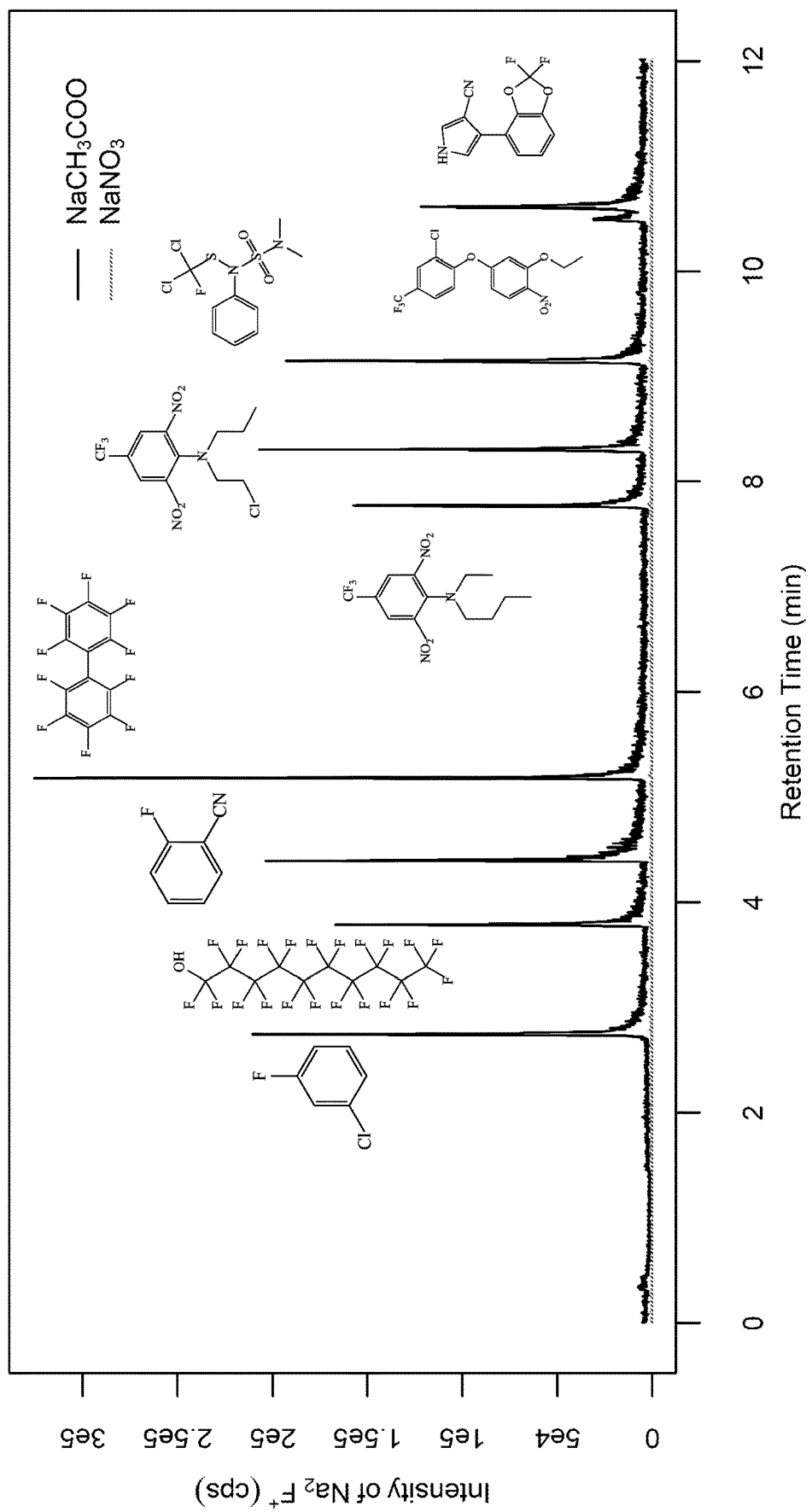
FIG. 3. Effect of nano-ESI electrolyte on detection of $Na_2F^+$ using apparatus of FIG. 1. $NaCH_3COO$ produces effective reagent ions for ionization of HF produced by the plasma while $NaNO_3$ does not produce efficient reagent ions for ionization of this neutral.

The reagent ions should be selected carefully to have efficient reactions with the neutral species. For example, FIG. 3 shows that use of $NaNO_3$ rather than $NaCH_3COO$ as the ionization reagent in nano-ESI of FIG. 1 does not produce $Na_2F^+$ ions from plasma products of the fluorinated compounds. This is because $Na(NaNO_3)_n^+$ ions do not react with HF which is the main plasma product of fluorinated compounds in the configuration shown in FIG. 1.

Figure 4:
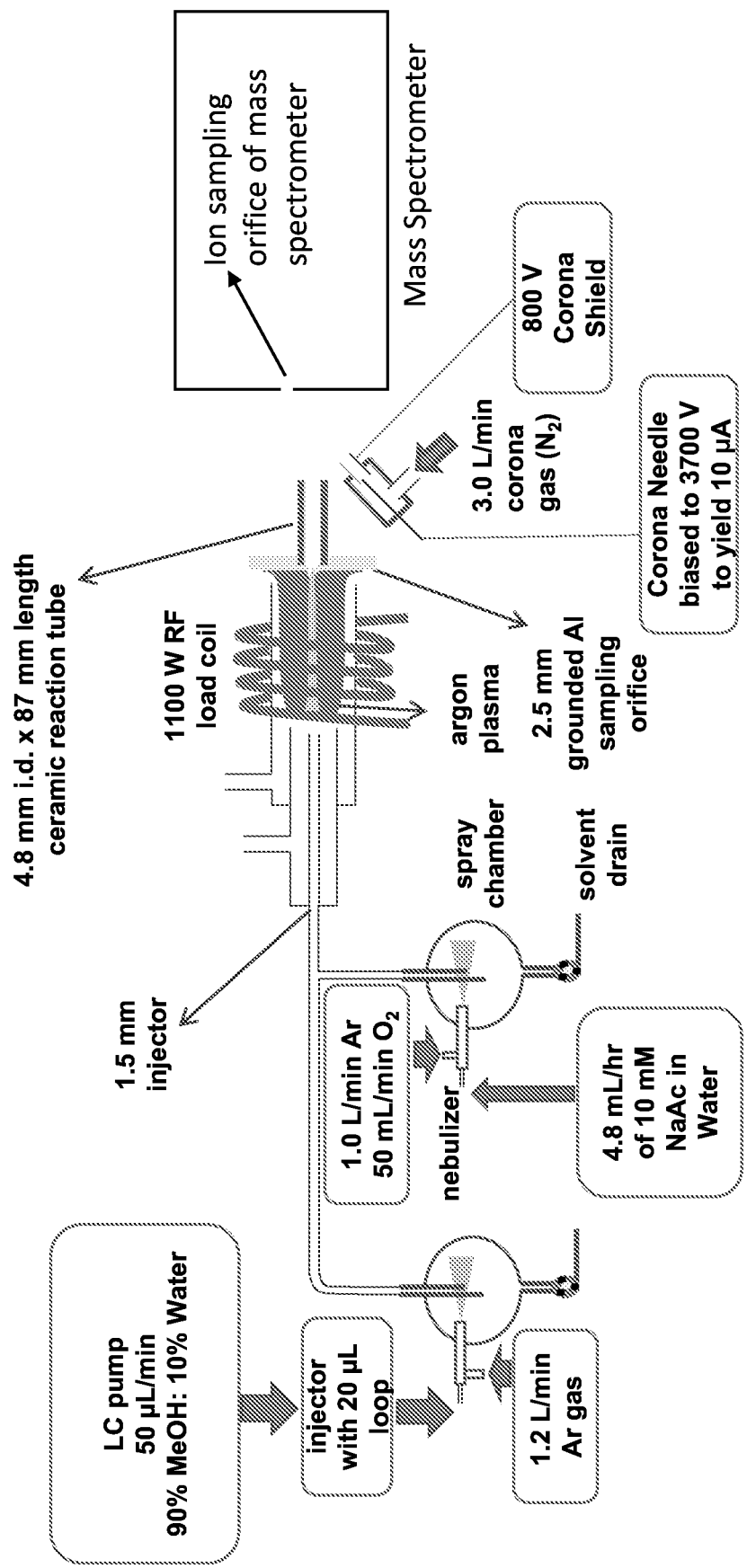
FIG. 4. Schematic of plasma assisted reaction with independent ionization using corona discharge for analysis of liquid samples. A sodium-containing compound is introduced as a reagent into the plasma, typically as a salt such as sodium acetate. The reagent in the plasma is used to control the element-specific neutral product of the plasma. For example, with sodium introduced into the plasma, fluorinated compounds yield NaF as neutral plasma product. Without sodium in the plasma, HF becomes the main neutral plasma product of fluorinated compounds. Introduction of sodium into the plasma is necessary if corona discharge is used as the independent ionization to form $Na_2F^+$ because corona discharge does not inherently create sodiated ions which have been found useful in our studies based on their stability. With electrospray as the independent ionization source, sodium may be omitted from the plasma.

In another configuration shown in FIG. 4, an atmospheric pressure argon inductively coupled plasma is used to produce element-specific ions while corona discharge is used for producing charging ions. A sodium-containing salt (e.g. sodium acetate) is introduced into the plasma to form sodium-containing neutral plasma products such as NaF (from fluorinated compounds) and NaOH (from solvents such as water). Corona discharge creates protonated reagent ions (e.g $H_3O^+$ from residual moisture in the gas around the corona needle) which are then directed to interact with neutral plasma products. The interaction coverts the protonated ions to sodiated ions and results in eventual formation of $Na_2F^+$ from fluorinated compounds introduced into the plasma.

Figure 5:
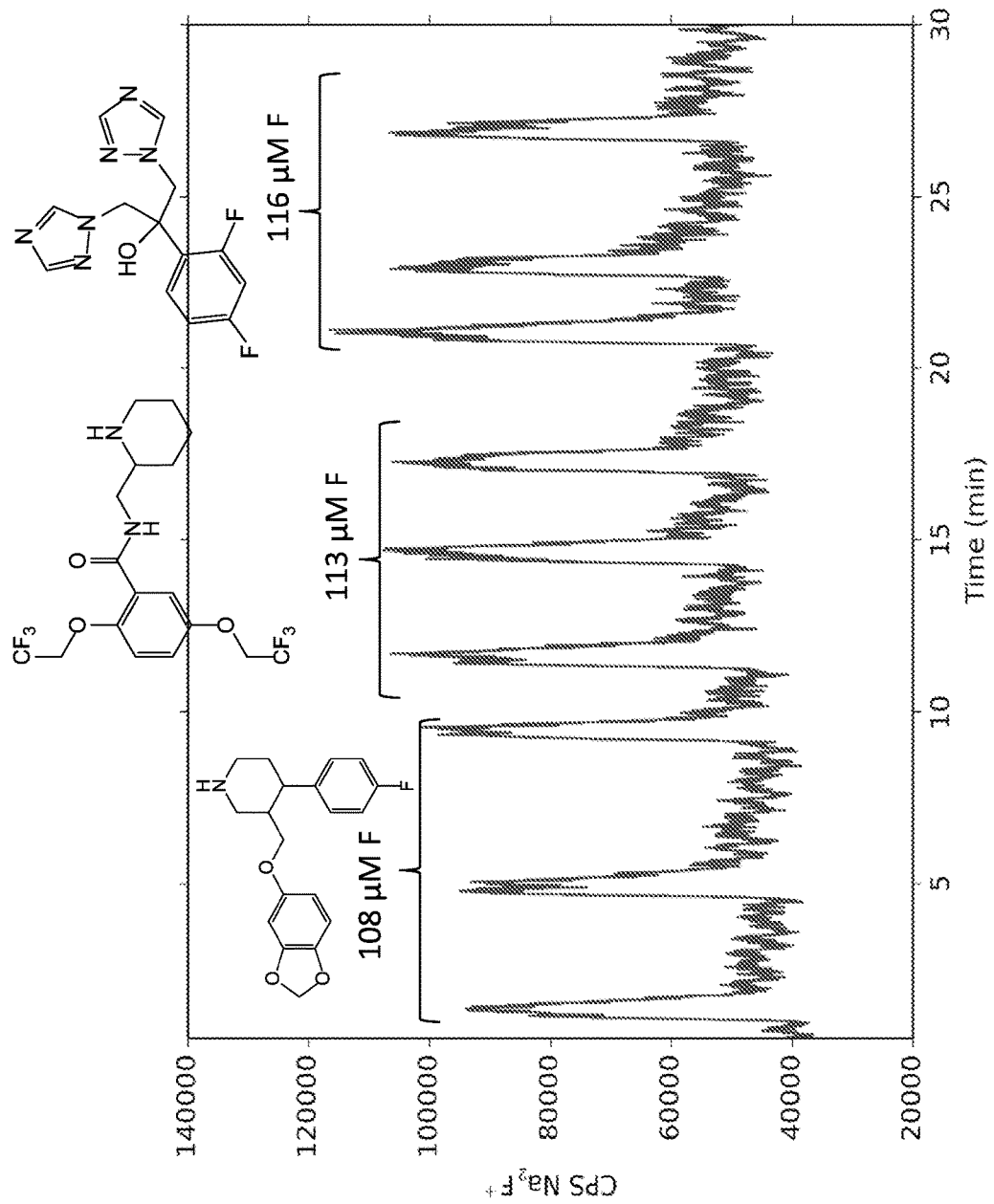
FIG. 5. Detection of fluorinated compounds by flow injections using apparatus of FIG. 4 and monitoring $Na_2F^+$ in the mass spectrometer.
Figure 6:
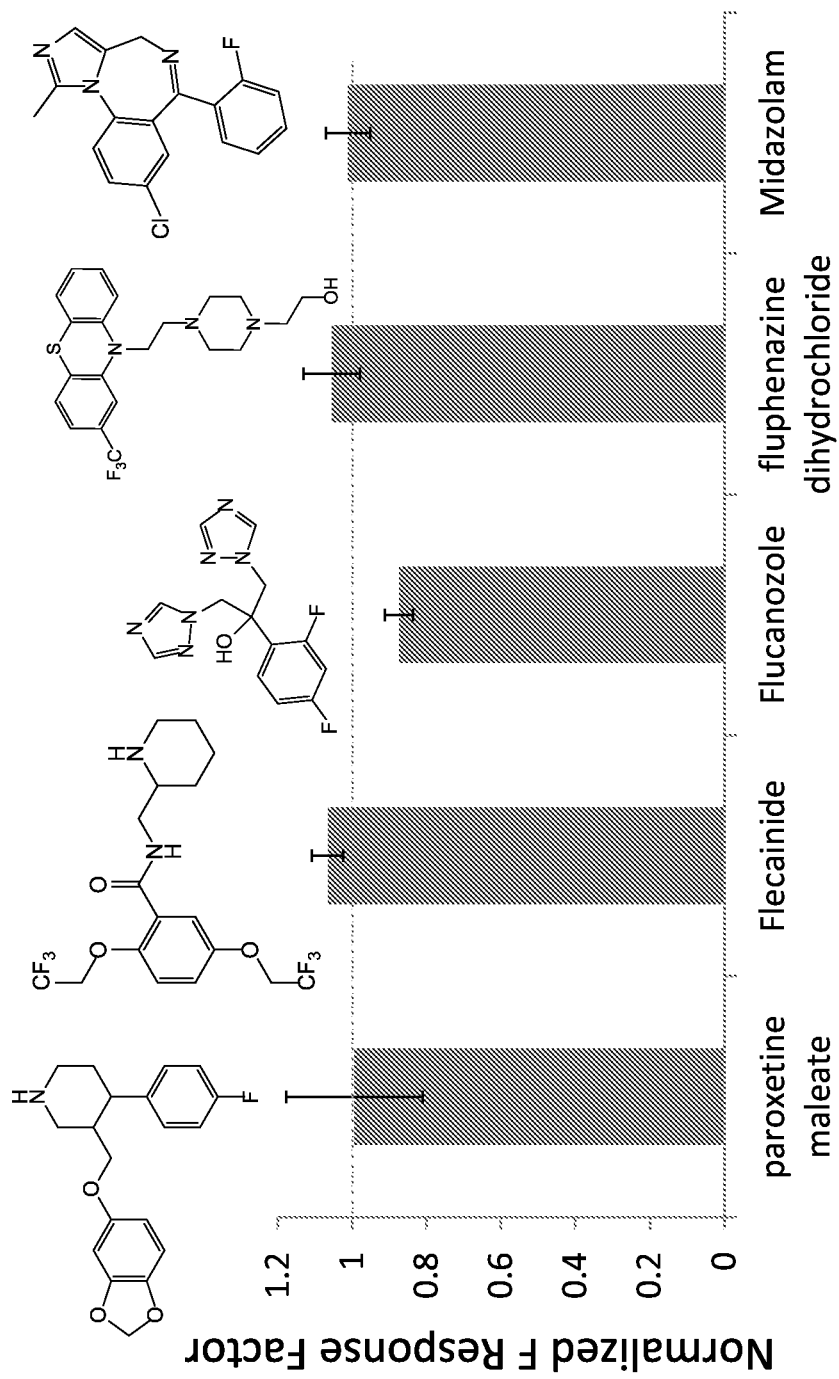
FIG. 6. Fluorine (F) response factors from various fluorinated compounds normalized to the average response factor illustrate that fluorine is detected from fluorinated compounds with near constant efficiency regardless of the chemical structure of the compounds.

An example is shown in FIG. 5 for flow injections of fluorinated compounds in apparatus of FIG. 4 resulting in detection of $Na_2F^+$. Importantly, FIG. 6 demonstrates the quantitative capabilities of the disclosed methods. Here, F response factor from each compound is first calculated based on average flow injection peak areas divided by the concentration of F supplied by the atoms of the molecule. The F response factors among various compounds are then normalized to the average response factor of all tested compounds. A normalized response factor of close to unity in FIG. 6 for the analytes illustrates that F can be detected from each molecule with constant efficiency. Therefore, the molecules can be quantified without compound-specific standards.

Figure 7:
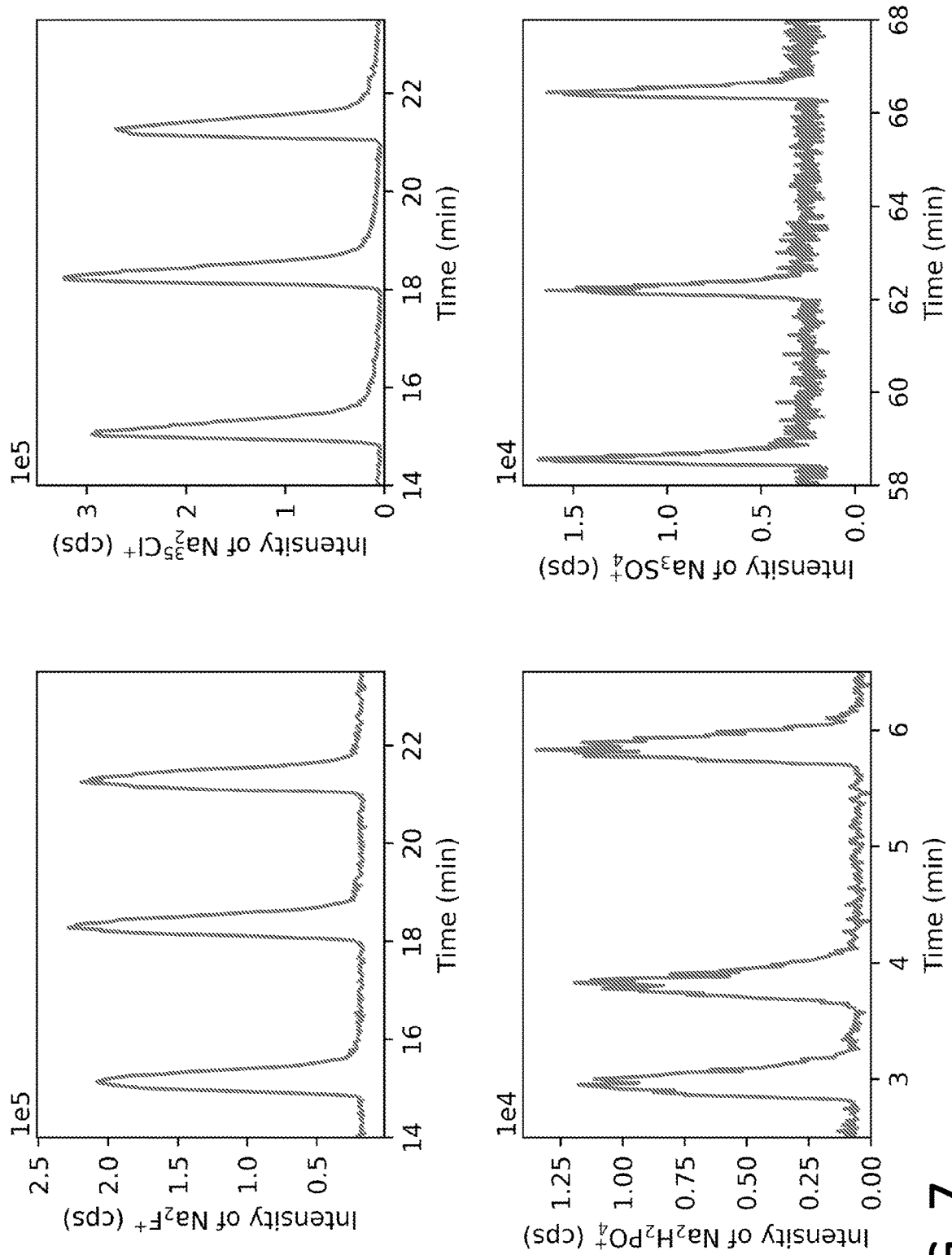
FIG. 7. Detection of compounds containing F, Cl, P, and S by flow injection analysis using the apparatus of FIG. 4 where the corona discharge is replaced by a nano-ESI and the sodium acetate introduced into the second spray chamber is replaced with water to eliminate sodium in the plasma. 10 mM sodium acetate is used as nano-ESI solution to create reagent ions to charge the neutrals emerging from the plasma. Element-specific ions monitored by the mass spectrometer are $Na_2F^+$, $Na_2Cl^+$, $Na_2H_2PO_4^+$, and $Na_3SO_4^+$.

The corona discharge in FIG. 4 may be replaced with a nano-ESI to spray a sodium containing solution (e.g. sodium acetate) and to create sodiated reagent ions (e.g. $Na_{n+1}(CH_3COO)_{n+}$). In this mode of operation, introduction of sodium-containing salts into the plasma (e.g. sodium acetate introduced via a second spray chamber in FIG. 4) is not necessarily needed. Plasma reaction products including protonated analyte-specific neutral molecules (e.g. HF) are guided into an atmospheric-pressure tube for further reactions and cooling. The flow at the outlet of the tube is intersected by an ion cloud produced by the nano-ESI emitter. Interaction of the analyte-specific neutral molecules with sodiated ions from the nano-ESI leads to ion/neutral reactions that form sodiated analyte-specific ions from the sample compounds. FIG. 7 shows the detected element-specific ions using this embodiment for molecules containing F, Cl, P, and S introduced into the first spray chamber of the apparatus via flow injections.

In one example of the corona discharge embodiment, plasma reaction products are guided into an atmospheric-pressure ceramic tube for further reactions and cooling. The tube outlet is intersected by a flow carrying reagent ions (e.g., a protonated ion) from a corona discharge. Reactions between reagent ions and plasma products lead to formation of analyte-specific ions from the sample compounds. The ions are then detected using a triple quadrupole MS.

An illustrative sodiated reagent ion (i.e., an ion that contains sodium) is $Na(NaA)_n^+$, wherein A represents the anion of the ESI electrolyte) and n represents cluster order. Specific examples include $Na(NaCH_3COO)_n^+$, wherein n is 1 to 9. Other reagent ions may include $Na(NaHCOO)_n^+$, wherein n is 1 to 9, and $Na_{n+1}(NO_2)_n^+$, wherein n is 1 to 9. Sodium-containing ions are particularly useful, since it has been found that sodium-containing ions are stable in after-plasma conditions.

Illustrative neutral species of the analyte include NaF, HF, HCl, NaCl, $H_3PO_4$, $NaH_2PO_4$, $Na_2HPO_4$, $Na_3PO_4$, $H_2SO_4$, $NaHSO_4$, and $Na_2SO_4$. Interaction of these neutrals with sodiated reagent ions lead to formation of $Na_2F^+$, $NaH_3PO_4^+$, $Na_2H_2PO_4^+$, $Na_3HPO_4^+$, $Na_4PO_4^+$, $Na_2HSO_4^+$, and $Na_3SO_4^+$.

In certain embodiments, introduction of sodium acetate into the plasma may be used for enhancing neutral generation.

In certain embodiments, the interaction of ions from the independent ion source with the neutral species from the gas plasma (after the neutral species exits the reaction tube) occurs in open air directly upstream of the mass spectrometer inlet.

In an embodiment, a sample containing one or more analytes may be introduced to a chromatographic system in order to separate the analytes from the sample. The chromatographic step allows for the separation of one or more analytes of interest in a sample via a chromatographic column. In an embodiment, the chromatographic step may include liquid chromatography or gas chromatography. In a particular embodiment, the chromatographic step is liquid chromatography. In a specific embodiment, the chromatographic step is high performance liquid chromatography (HPLC).

Following liquid chromatography, nebulization of an analyte solution coming from the liquid chromatograph may be provided. Nebulizers that may be used include, but are not limited to, thermospray nebulizers (TSN) and pneumatic high efficiency nebulizers (HEN). (See Jorabchi, et al., *Anal. Chem.* 2005, 77, 5402-5406.)

In the gas plasma module the analyte is converted into element-specific neutrals. Illustrative gas plasma modules include a microwave induced plasma, an inductively coupled plasma, a glow discharge plasma, a capacitively coupled plasma, and a dielectric barrier discharge.

In an embodiment, the plasma cavity is maintained at atmospheric pressure. In another embodiment, the plasma cavity is maintained in a pressure range lower than atmospheric pressure (e.g., 1 to less than 760 Torr).

After the neutral reaction products are formed in the gas plasma, the products exit the gas plasma and travel downstream where they interact with the above-described reagent ions.

The foregoing methods and apparatuses provide for the quantitative analysis of a variety of samples comprising a variety of analytes. In particular embodiments, the analytes may be non-volatile chemical compounds. In certain embodiments, the analyte is from a petrochemical analyte, an agrochemical analyte, a biological analyte, or a pharmaceutical analyte. In certain embodiments, the analyte is an organic chemical compound, including but not limited to an amino acid, a carbohydrate, a nucleic acid, a polypeptide, a protein, or a lipid.

In certain embodiments, the analyte comprises one or more halogen atoms. In particular embodiments, the halogen atom is selected from one or more halogen atoms from the group consisting of fluorine, bromine, and chlorine. In specific embodiments, the analyte contains fluorine.

In certain embodiments, the analyte contains sulfur, and/or phosphorus.

The elemental analysis methods disclosed herein are useful for several different applications. For example, the methods enable quantification without standards. Concentrations of compounds are used in many areas for decision making. For instance, metabolites of a newly developed drug must be quantified in biological matrices prior to clinical trials of the drug. Often quantification is challenging because pure compounds are not available to calibrate instruments. Elemental quantification offers a major advantage in this regard where molecules can be quantified using their atoms and universal standards, alleviating the need for compound-specific standards. In another instance, the methods disclosed herein enable detection of novel compounds. For example, identifying elution times of compounds containing certain elements (e.g. F and P) in a chromatographic separation provides a facile way of detecting new compounds that contain the element of interest.

Example 1

Nano-electrospray ionization subsequent to dielectric barrier discharge (DBD) reactions of fluorinated compounds produces F-specific ions for non-targeted detection of compounds in complex samples. "Non-targeted" refers to analyzing a sample without a particular hypothesis of what molecules are present in the sample.

Non-targeted detection of fluorinated compounds is difficult because of the lack of isotopic signatures for this element. Mass defect may be used for detecting polyfluorinated compounds; however, its application to molecules with a limited number of fluorine atoms is hindered by small mass defects. Disclosed in this example is a new elemental ionization technique as a universal approach for detecting fluorinated compounds. A combination of plasma reactions and electrospray ionization allow generation of $Na_2F^+$ ions from fluorinated compounds separated by GC regardless of their chemical structure. Thus, retention times for fluorinated compounds are readily identified in the chromatogram. Molecular ionization then allows identification of these compounds by investigating the mass spectra at the flagged retention times.

As shown in FIG. 1, Fluorinated compounds separated by GC were delivered into a dielectric barrier discharge (DBD) sustained in helium gas in a pin-to-ring geometry. DBD reaction products in the helium flow were further diluted by nitrogen to interact with nano-ESI ions [e.g. $Na_{n+1}(CH_3COO)_n^+$], generating $Na_2F^+$ ions which were then detected by a triple-quadrupole MS. Various sodium-containing electrolytes including sodium acetate, sodium formate, sodium nitrate, sodium nitrite, and sodium hydroxide dissolved in water were used as nano-ESI solutions but sodium acetate offered the best sensitivity. For example, FIG. 3 shows that use of sodium nitrate does not generate F-specific ions unlike sodium acetate electrolyte. For molecular identification, nano-ESI was replaced by a corona discharge acting as an APCI ion source (in this molecular mode the gas plasma (i.e., the DBD is turned off)). For fiber screening, 10 mg of fiber was extracted in 1.5 mL ethyl acetate and analyzed by GC-DBD-nano-ESI-MS. Combination of isotopic ratios and MS/MS in the molecular mode were then used to identify the molecules at the flagged retention times for fluorinated compounds. Thus, the apparatus disclosed herein can be toggled between an elemental mode and a molecular mode as desired.

Our investigations on the nature of DBD reaction products indicate that the $Na_2F^+$ is likely a result of interaction between HF and nano-ESI. Two ionization mechanisms are proposed for this interaction: 1) ion-neutral reactions of HF with $Na(NaA)_n^+$ reagent ions in the gas-phase (where A represents the anion of the ESI electrolyte); 2) capture of HF by ESI droplets followed by ionization from solution-phase. The effects of various sodium-containing electrolytes were investigated to differentiate between the two proposed mechanisms. By considering gas-phase ion-neutral reaction energetics and solution ionization efficiencies, our data indicates that mechanism 1 is the dominant pathway.

The analytical figures of merit were evaluated for sensitivity and linearity. The limit-of-detection of fluorine on-column was 3.5-19.4 pg and a linear dynamic range of 40-1000 pg F on-column was established for nine fluorinated compounds.

As an example of non-targeted analysis, we screened fabrics with fluorinated coatings often used to impart oil and water repellency. Presence of a fluorinated compound in the extraction of Chico's brand shirt was identified by a peak for $Na_2F^+$ at retention time of 5.8 min using GC-DBD-nano-ESI-MS. Examination of the APCI spectra at this retention time showed an ion with m/z of 433. Fragmentation of this ion resulted in m/z 59, 69 and 87, suggesting presence of a methacrylate moiety. Accordingly, a common fluorinated methacrylate monomer, 1H,1H,2H,2H-perfluorooctyl methacrylate, was injected as a hypothesized analyte. The standard matched the unknown sample in terms of retention time, fragmentation, and isotopic ratios. The above example illustrates the utility of GC-DBD-nano-ESI as a non-targeted detection technique for fluorinated compounds.

In view of the many possible embodiments to which the principles of the disclosed invention may be applied, it should be recognized that the illustrated embodiments are only preferred examples of the invention and should not be taken as limiting the scope of the invention.

What is claimed is:

1. A method comprising;
   introducing at least one analyte into a gas plasma;
   generating neutral species from atoms of the analyte in the gas plasma;
   transporting the neutral species downstream of the gas plasma; and
   reacting the neutral species of the analyte with at least one reagent ion downstream of the plasma resulting in ion species of the analyte, wherein the at least one reagent ion is supplied by an independent ion source.

2. The method of claim 1, further comprising introducing the resulting ion species of the analyte into a mass spectrometer.

3. The method of claim 1, further comprising introducing a sample into a chromatograph and separating the sample into at least one compound that includes at least one detectable atom for introducing into the gas plasma.

4. The method of claim 3, wherein the chromatograph is a gas chromatograph and the gas plasma is an atmospheric pressure dielectric barrier discharge.

5. The method of claim 3, wherein the chromatograph is a liquid chromatograph and the gas plasma is an inductively coupled plasma.

6. The method of claim 1, wherein the at least one reagent ion is generated via electrospray ionization as the independent ion source.

7. The method of claim 6, wherein the at least one reagent ion is a sodiated reagent ion.

8. The method of claim 6, wherein the at least one reagent is selected from $Na_{n+1}(HCOO)_n^+$, wherein n is 1 to 9; or $Na_{n+1}(NO_2)_n^+$, wherein n is 1 to 9.

9. The method of claim 6, wherein the at least one reagent ion is $Na_{n+1}(CH_3COO)_n^+$, wherein n is 1 to 9.

10. The method of claim 1, wherein the at least one reagent ion is a protonated ion generated via corona discharge as the independent ion source.

11. The method of claim 10, wherein the at least one reagent ion is $H_3O^+$.

12. The method of claim 10, further comprising introducing a sodium-containing salt into the gas plasma.

13. The method of claim 1, wherein the neutral species of the analyte is NaF, HF, HCl, NaCl, $H_3PO_4$, $NaH_2PO_4$, $Na_2HPO_4$, $Na_3PO_4$, $H_2SO_4$, $NaHSO_4$, $Na_2SO_4$, or a mixture thereof.

14. The method of claim 1, wherein the analyte is a S-containing analyte, a P-containing analyte, a Cl-containing analyte, a F-containing analyte, or a mixture thereof.

15. The method of claim 9, wherein the analyte is a F-containing analyte.

16. An apparatus comprising:
    a gas plasma module;
    an ion source downstream from the gas plasma module, wherein the ion source is an electrospray ionization module or a corona discharge module; and
    a mass spectrometer downstream from the ion source.

17. The apparatus of claim 16, further comprising a chromatograph upstream of the gas plasma module.

18. The apparatus of claim 17, wherein the chromatograph is a gas chromatograph and the gas plasma module includes an atmospheric pressure dielectric barrier discharge chamber.

19. The apparatus of claim 17, wherein the chromatograph is a liquid chromatograph and the gas plasma module includes an inductively coupled plasma chamber.

20. The apparatus of claim 17, wherein the chromatograph is a gas chromatograph and the gas plasma module includes an inductively coupled plasma chamber.

* * * * *